No. 617,128. Patented Jan. 3, 1899.
A. B. SEE, N. O. LINDSTROM & D. A. MASON.
ELECTRIC ELEVATOR.
(Application filed Apr. 26, 1898.)

(No Model.) 6 Sheets—Sheet 1.

WITNESSES:
H. W. Lloyd
C. E. Ashley

INVENTORS:
Alonzo B. See
Nils O. Lindstrom &
Daniel A. Mason.
By their Attorney

No. 617,128. Patented Jan. 3, 1899.
A. B. SEE, N. O. LINDSTROM & D. A. MASON.
ELECTRIC ELEVATOR.
(Application filed Apr. 26, 1898.)

(No Model.) 6 Sheets—Sheet 3.

WITNESSES:
H. W. Lloyd
C. E. Ashley

INVENTORS:
Alonzo B. See
Nils O. Lindstrom &
Daniel A. Mason.
By their Attorney

No. 617,128. Patented Jan. 3, 1899.
A. B. SEE, N. O. LINDSTROM & D. A. MASON.
ELECTRIC ELEVATOR.
(Application filed Apr. 26, 1898.)
(No Model.) 6 Sheets—Sheet 4.

WITNESSES:
H. W. Lloyd
C. E. Ashley

INVENTORS:
Alonzo B. See
Nils O. Lindstrom &
Daniel A. Mason.
By their Attorney

No. 617,128. Patented Jan. 3, 1899.
A. B. SEE, N. O. LINDSTROM & D. A. MASON.
ELECTRIC ELEVATOR.
(Application filed Apr. 26, 1898.)
(No Model.) 6 Sheets—Sheet 6.

WITNESSES:
H. W. Lloyd
C. E. Ashley

INVENTORS:
Alonzo B. See
Nils O. Lindstrom &
Daniel A. Mason.
By their Attorney

UNITED STATES PATENT OFFICE.

ALONZO B. SEE, NILS O. LINDSTROM, AND DANIEL A. MASON, OF NEW YORK, N. Y.

ELECTRIC ELEVATOR.

SPECIFICATION forming part of Letters Patent No. 617,128, dated January 3, 1899.

Application filed April 26, 1898. Serial No. 678,861. (No model.)

*To all whom it may concern:*

Be it known that we, ALONZO B. SEE, of New York, (Brooklyn,) county of Kings, NILS O. LINDSTROM, of New York, (Union Course,) Queens county, and DANIEL A. MASON, of New York, (Brooklyn,) county of Kings, State of New York, have invented certain new and useful Improvements in Electric Elevators, of which the following is a specification.

This invention relates to electric elevators, and particularly to a type adapted for installation in residences and which may be controlled without the assistance of other attendant than the passenger who desires to be transferred from floor to floor.

The object of the invention is to adapt an elevator to fulfil this function and to be capable of independent control from the several floors or landings or from the car itself, so that the car may be brought to any floor by a person standing at the elevator on said floor, and after the passenger has entered the car may be actuated to raise or lower him to any floor in the building he may desire to reach. In attaining this object it is of course necessary to render the two modes of control—that is to say, from the several floors and from the car itself—non-interfering, so that if the car be occupied by a passenger a prospective passenger on one of the landings can by no possible means acquire control of the car until the passenger has reached his destination.

It is a further object of the invention to so organize the system of wiring that the car will be brought to the floor or landing on which the prospective passenger is standing irrespective of the position of the car in the shaft at the moment the call is made, whether above or below the passenger.

The invention is carried out by providing on each floor a circuit-closer by which the driving-motor may be thrown into operation and by mounting near the driving apparatus an automatically-operated controller or governor by which the floor-switches are enabled to operate the driving-motor in one direction or the other, according to the position of the car—that is to say, if the car be above the floor on which the passenger stands a simple pressure on the floor-switch will bring the car down to him and stop it at his landing, or if the car be below his floor the same pressure on the switch will operate the driving-motor in the reverse direction and the car will be arrested at his landing. The circuit-closers in the car, of which there is one for each floor at which the car is to stop, are so arranged that all of the floor-switches may be disabled when any car-switch is operated, thus giving the passenger in the car absolute control of its movements. At each floor is provided an auxiliary floor-switch by which the shaft-door is locked until the car arrives at the landing, when the door may be opened, and the circuit connections are such that when the door is open all motor-controlling circuits of the entire system are disabled, so that the car cannot be started until the door is again closed. The car is driven, preferably, by a polyphase electric motor, a small auxiliary motor being employed to operate the switches by which the main motor is cut in or out. Upon closure of the circuits of the auxiliary motor, which includes the several controlling-switches in the car and on the several landings, the brakes are automatically removed from the driving machinery and the auxiliary motor acts against a weight to close the contacts by which current is admitted to the main propelling-motor, which latter raises the car to the desired landing, on reaching which the brakes may be set by the passenger releasing the push-button or switch, thus opening the motor-circuits and holding the car. The main-motor circuits are automatically opened and the brake set when the car reaches the top or bottom of the shaft. This result is effected by a device controlled by the lifting machinery, which by a rack-and-pinion movement forces the auxiliary motor to a position which opens the main-motor circuits and sets the brakes.

The invention also includes an improved type of dash-pot by which an effective movement of the auxiliary motor is secured in its various operating positions.

The several features of novelty of the invention will be hereinafter more fully described and will be definitely indicated in the claims appended to this specification.

In the accompanying drawings, which illustrate the invention, Figure 1 is a diagrammatic view of a system embodying our improvements. Fig. 1ᵃ is a detail view of one of the car-switches. Fig. 4ᵃ is a view of the dash-pot on a plane at right angles to that indicated in Fig. 4. Fig. 6ᵃ is a top plan of Fig. 6, the cover of the switch-box being removed. Fig. 6ᵇ is a sectional side elevation of the auxiliary motor and switch-box on a plane indicated by the line $X' y'$ of Fig. 6ᵃ, looking in the direction indicated by the arrows. Fig. 6ᶜ is a sectional view on the plane $x^2 y^2$ of Fig. 6ᵃ, looking in the direction indicated by the arrows; and Fig. 7 is a sectional view of one of the brushes used in the switch-box for the auxiliary-motor circuits.

Figures 1, 1A:
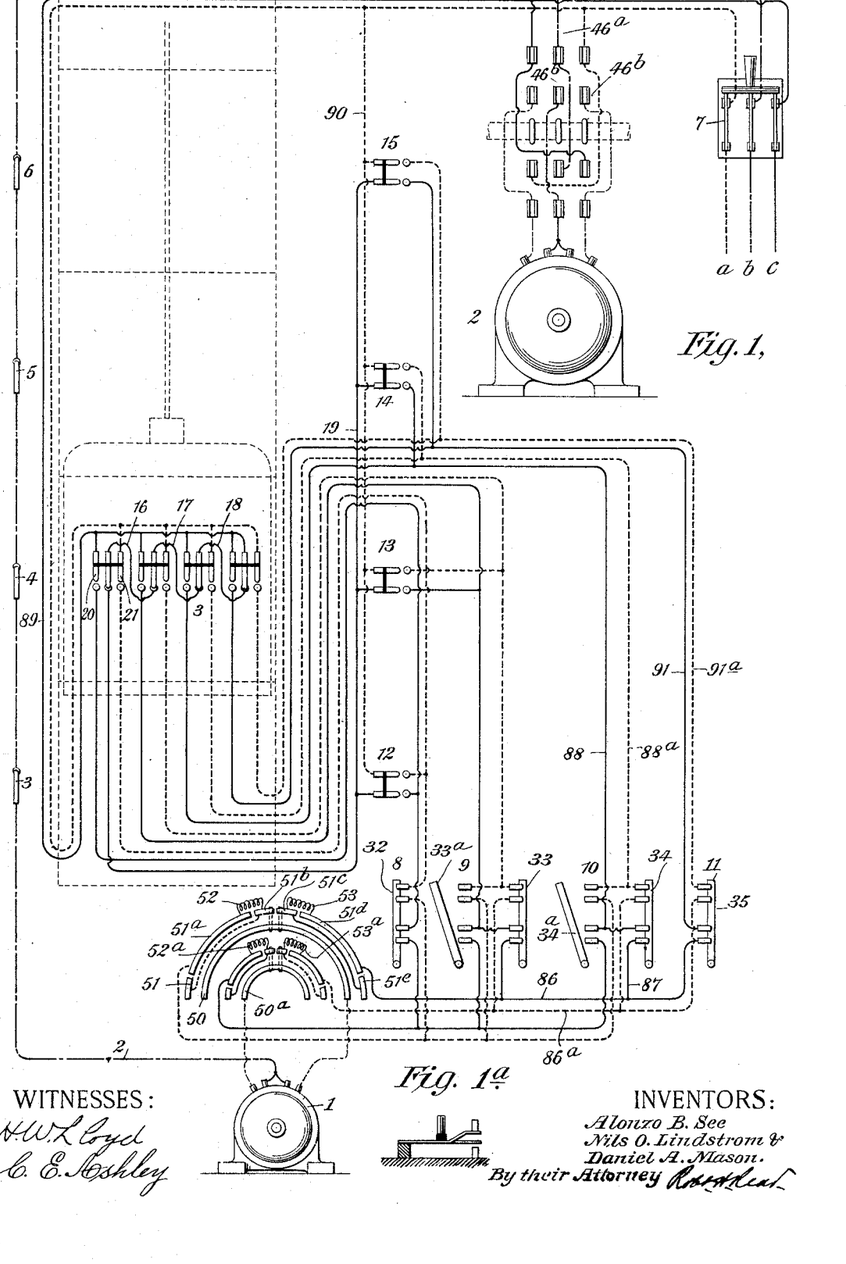

Referring first to Fig. 1, the numeral 1 indicates a polyphase motor by which the circuits of a main driving-motor 2 are controlled. While we have shown herein and prefer to employ polyphase motors for operating the elevator, the invention is equally applicable to direct-current motors. In the system exemplified in the drawings quarter-phase motors are employed—that is to say, one element of the motor, usually called the "armature," is wound or provided with a simple closed circuit to which no brushes or connections from the main circuit lead, the magnetizing-currents being created inductively by the rotary magnetic field developed by two quarter-phase currents in the stationary part of the motor. As this type of motor is familiar and a standard piece of electric apparatus, it will be unnecessary to complicate the drawings or specification by a specific description of its organization. The motors are therefore shown in the drawings in a typical form, which will be recognized and understood as features of simple electrical engineering. The two windings of the rotary field or outside element of the auxiliary motor 1 are provided with a common connection leading by a conductor 2 up the shaft and including at each landing a switch 3 4 5 6, according to the number of landings. These switches are so arranged that when the shaft-door of any landing is opened the corresponding switch will be opened, thus opening the common branch circuit 2, which leads to one terminal $b$ of the three-wire circuit $a b c$, by which the motors are supplied with quarter-phase currents. The main-circuit switch 7 may be located in any convenient part of the building and remains closed when the elevator is in service. The other two supply-wires $a c$ lead through a flexible cable to a series of switches in the car, of which four are shown. These switches are normally open, but when closed complete the connections of the two wires $a$ and $c$ to the auxiliary motor 1 through the governor-switches 8 9 10 11 and through the rheostat of the auxiliary motor, as indicated in the diagram. Each of the car-switches has three contact-arms, as shown in the diagram, one of which is normally in engagement with its contact-stud, (the middle one as shown in the diagram,) by which one of the circuit branches $c$ is led through the flexible cable connected to the car and the several floor-switches 12 13 14 15 (with which it connects in parallel) to the auxiliary motor, including the corresponding governor-switch 8 9 10 11. The normally-closed arms of the car-switches are all connected in series by wires 16 17 18, the two terminal arms being connected, respectively, with the main wire $c$ and the wire 19, leading to the floor-switches. Thus in the position of the parts shown this branch circuit is closed through the car-switches to the floor-switches; but if any car-switch be operated its middle arm will be disengaged from the contact-stud, thereby opening the branch $c$ and disabling the floor-switches from operating the auxiliary motor or starting the car. When any car-switch, however, is pressed by a passenger, the two outside contact-arms—as 20 and 21, for example—close the supply branches $a$ and $c$ through the flexible cable and the corresponding circuit-closer of the governor. For example, if the switch to the extreme left of the car were operated the circuit would be completed through the governor-switch corresponding to the first landing, and if any other switch were operated the circuit would likewise be closed through the corresponding governor-switch 9 10 11 for said landing. The auxiliary and main motors would be thereby energized in a way presently described and would bring the car to the first landing. Similarly if any of the floor-switches 12, 13, 14, or 15 be actuated the circuit would be completed (provided the passenger was not controlling one of the car-switches) through its corresponding governor-switch, which would automatically open and stop the car when it reached the floor.

Figure 2:
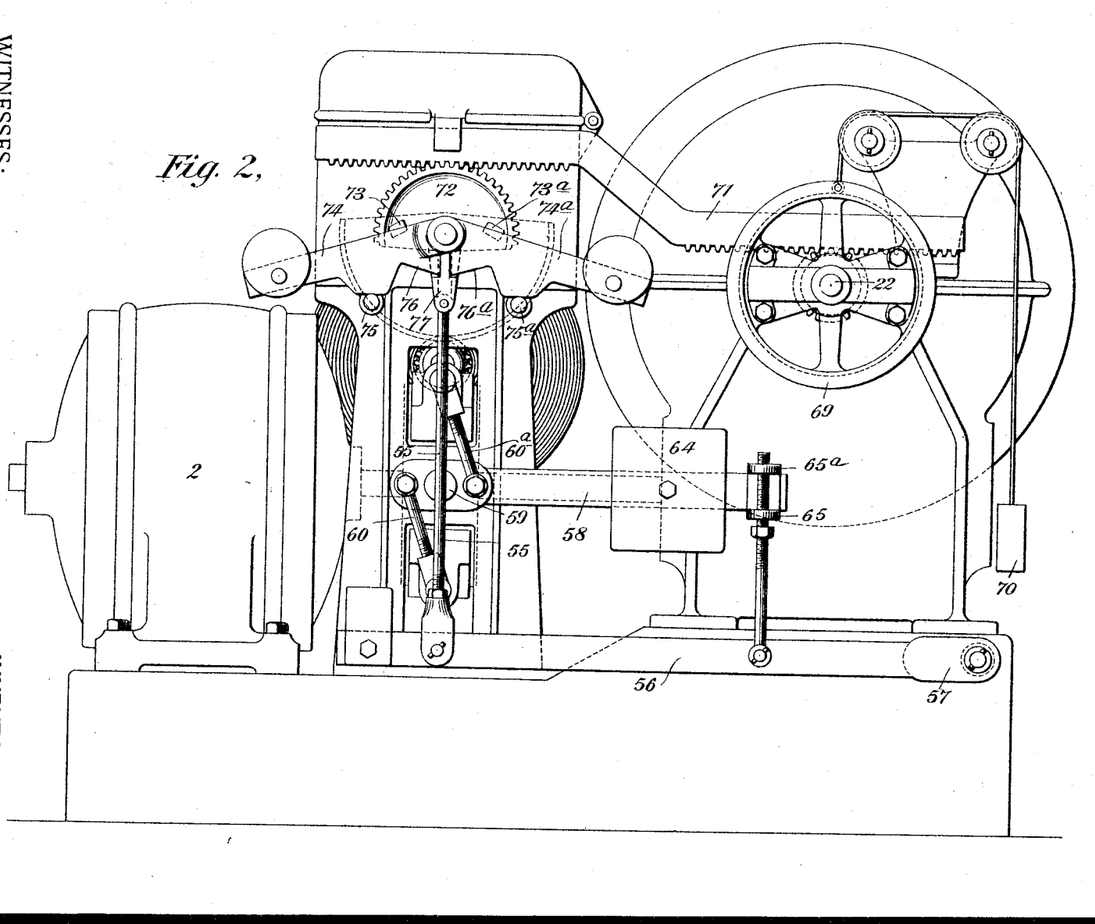
Fig. 2 is a side elevation of the operating machinery.
Figure 3:
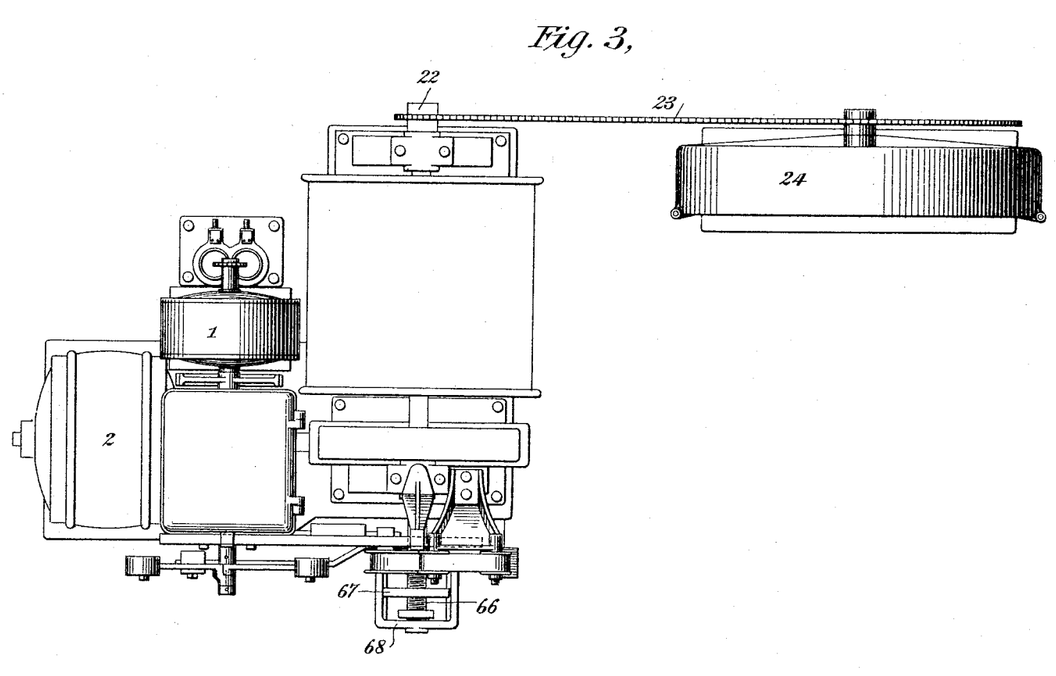
Fig. 3 is a top plan view of the apparatus shown in Fig. 2.
Figure 4:
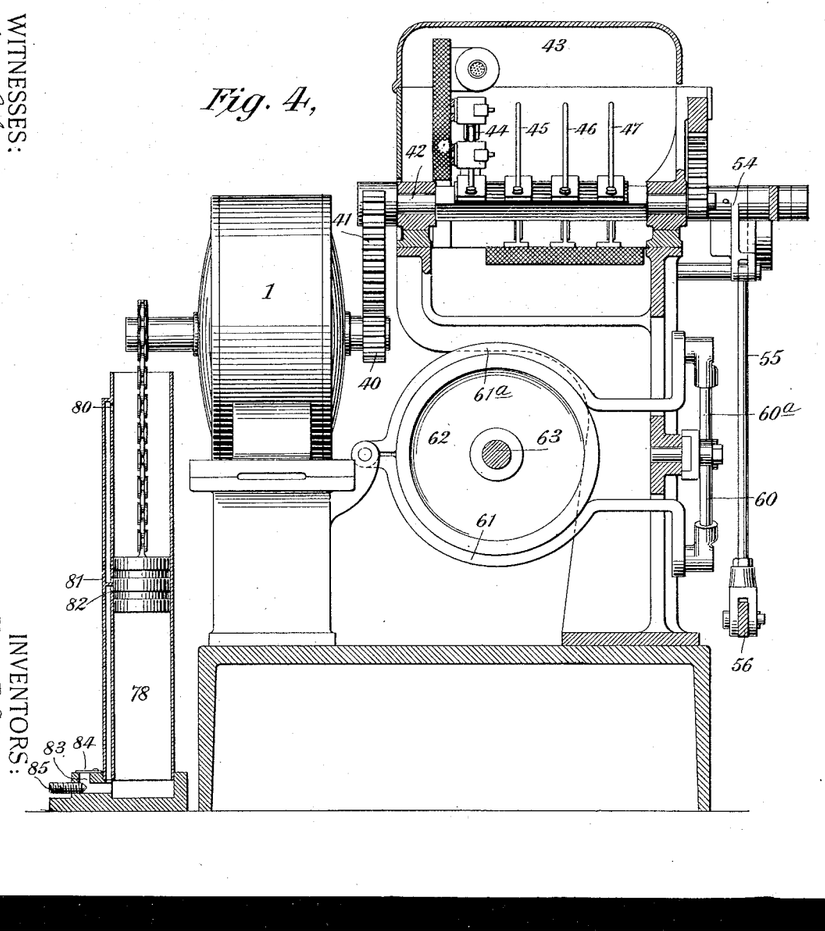
Fig. 4 is an end elevation of the apparatus, the switch-box and dash-pot being shown in section.
Figure 5:
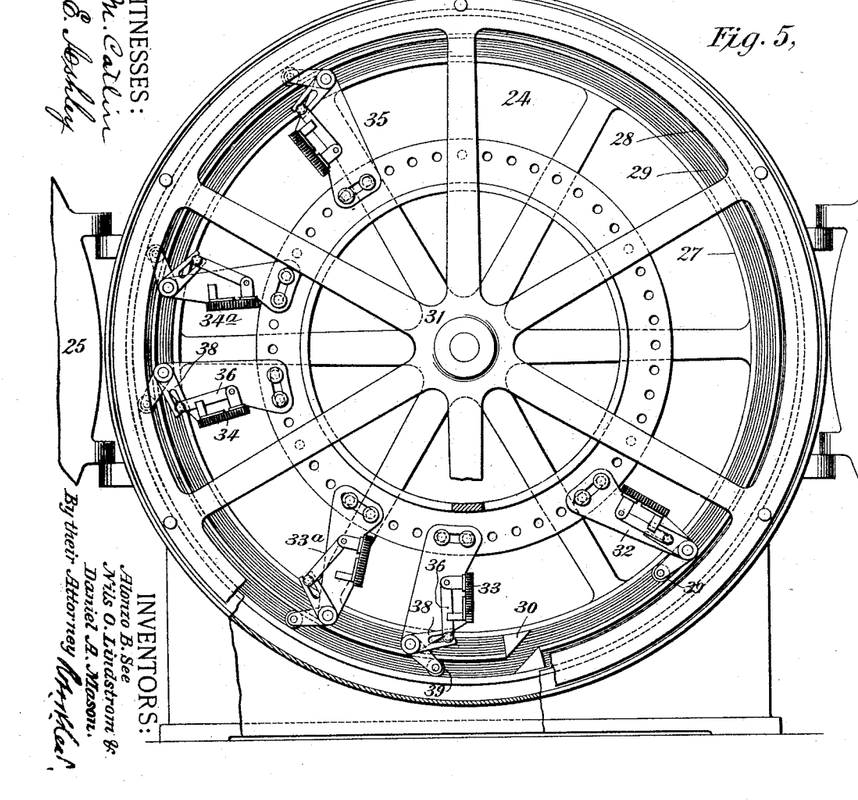
Figs. 5 and 5ᵃ are enlarged views of the circuit controller or governor by which the movements of the car are guarded, Fig. 5 being a front view on the plane indicated by the line $x y$ of Fig. 5ᵃ and Fig. 5ᵃ being a central transverse section of Fig. 5.
Figure 5A:
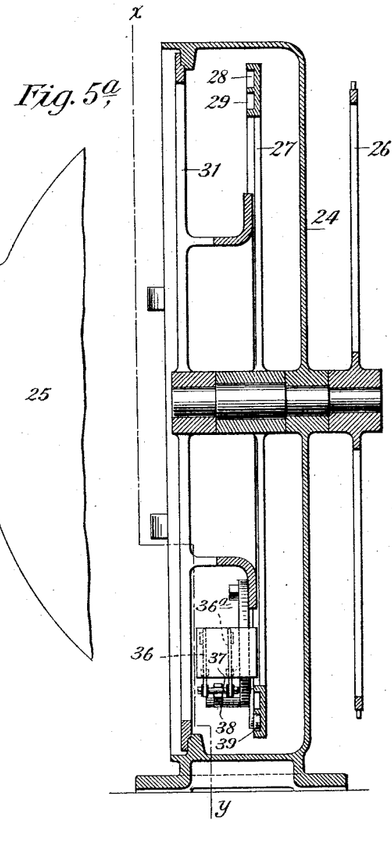
Figure 6:
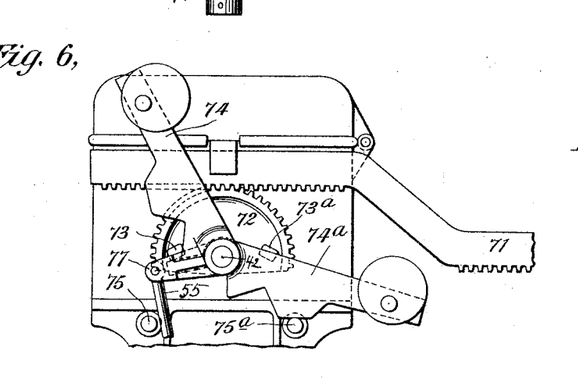
Fig. 6 is a side elevation of the switch-box and mechanical controlling apparatus for the auxiliary motor.
Figures 6A, 7:
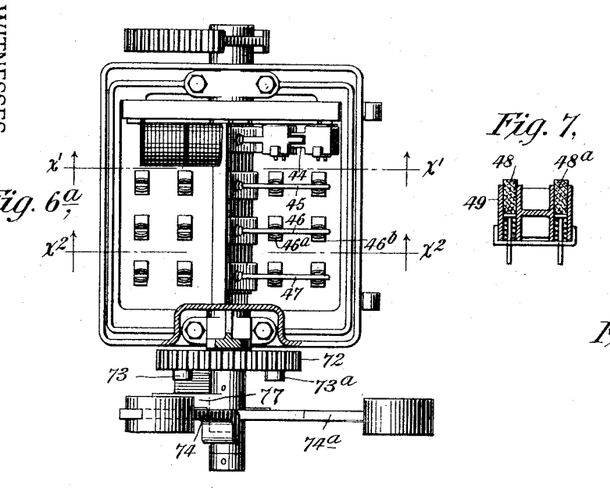
Figure 6B:
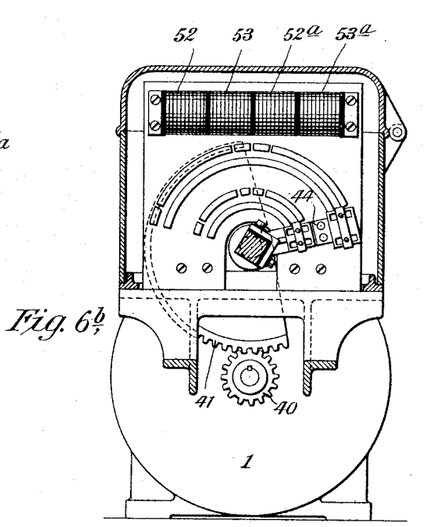
Figure 6C:
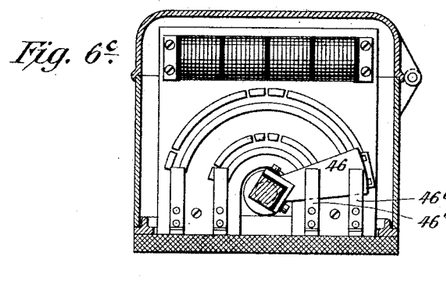

The operation of the governor will be understood from an inspection of Figs. 3, 5, and 5ᵃ. The drum-shaft 22 is connected by a sprocket wheel and chain 23 with the shaft of the governor 24, which is provided with a hinged door 25 to permit examination and adjustment of its parts. The sprocket-wheel 26 is rigidly secured to a shaft passing through the casing, to which is secured an annular guide 27, provided with two grooved channels 28 29, the grooves communicating with one another at a suitable point, as 30, by guide-walls, as indicated. On an annular plate 31, securely fastened to the rim of the governor-case, are mounted, at suitable circumferential positions corresponding to the distances apart of the several car-landings, circuit-closers 32, 33, 33ª, 34, 34ª, and 35. The number of these switches will of course vary with the number of landings. One should be provided for each terminal landing of the building and two for each intermediate landing. An annular flange of the plate is bored with a series of holes, comparatively close together, so that the circuit-closers may be shifted to accommodate the apparatus to different buildings, where the distances between the landings may vary. The arms on which the circuit-closers are mounted are secured to the perforated rim by bolts, as indicated in Fig. 5. Each circuit-closer comprises two hinged levers 36 36ª, (see Fig. 5ª,) connected together by an insulated yoke 37, which is straddled by a forked arm 38, forming part of an elbow-lever carrying at its outer end a roller 39, which travels in the grooves 28 29 of the guide-plate 27, above referred to. These elbow-levers are so set on the several switches that when the two corresponding to any intermediate floor, as 33 33ª, lie in the same groove 28 or 29 one will be open and the other closed. Thus, for example, as shown in the diagram Fig. 1, the car is between the first and second floor. The switches 34 and 34ª therefore which correspond to the third landing are one open and one closed—that is to say, the switch 34, which may be called the "up" switch, is closed, permitting the car to be called up when the third-floor switch is operated by a prospective passenger. The switch 34 is therefore connected (see diagram Fig. 1) to the auxiliary motor 1 in a reverse sense to switch 34ª. Therefore if the third-floor switch be actuated the circuit is completed over the switch-arm 34 to the right side of the rheostat, insuring a proper movement of the auxiliary motor to take the car up. If, however, the governor had been operated so as to bring the connecting-path of the inclined guide 30 (see Fig. 5) around to the left to a point beyond the switch 34ª, the latter would be closed and 34 would be opened, thus insuring that if the third-floor switch were pressed by a prospective passenger the circuit would be closed through switch 34ª, (see Fig. 1,) thus completing the auxiliary-motor circuit from the left side of the rheostat, insuring a down movement of the car. Thus the automatic actions of the governor insure a correct adjustment of the circuits and cause the car to approach any landing when its switch is operated irrespective of the position of the car in the shaft. The auxiliary motor 1 is provided with a pinion 40 on its shaft, (see Figs. 4 and 6ᵇ,) which gears with a sector 41, secured to an axis 42, passing through the switch-box 43. The axis carries switch-arms 44 45 46 47, the three latter being simple knife-blades, (see Figs. 6ª and 6ᶜ,) which bridge two pairs of spring-contacts, as 46ª 46ᵇ, in circuit with the main motor. There are two sets of these contacts for each blade 45 46 47, as indicated in Figs. 6ª and 6ᶜ, the right-hand pair being connected with the main driving-motor 2, (see Fig. 1,) so as to complete the three-wire circuit for one direction of travel, and the left-hand set being reversely connected for an opposite direction of travel. The auxiliary-motor switch 44 (see Figs. 4, 6ª, and 6ᵇ) carries two carbon brushes, each of which comprises, as indicated in Fig. 7, carbon blocks 48 48ª, held in a metal box 49 and pressed into firm engagement with their contact-bars by coil-springs, as shown in the figure. The two pairs of brushes are insulated from each other; but the two brushes of each pair are of course in electrical connection through the metal case in which they are mounted. They are mounted on the arm 44, so as to slide frictionally over arc-shaped contact-blocks. (See Figs. 1, 6ᵇ, and 6ᶜ.) There are two groups of these blocks, one member of each group, as 50 50ª, being a continuous semicircular conductor and the other member of each group being a semicircular conductor divided into six sections insulated from one another, as at 51 51ª 51ᵇ 51ᶜ 51ᵈ 51ᵉ. The semicircular contacts 50 50ª are connected, respectively, with two outside terminals of the auxiliary motor, the other two terminals of the auxiliary motor being connected with the conductor 2, as hereinbefore described. The segments 51ª, 51ᵇ, 51ᶜ, and 51ᵈ of each group of contacts are connected by inductive resistances 52 53 52ª 53ª, as best seen in Fig. 1. The conductors leading through the governor-switches from the car and floor switches connect in parallel with two sets of conductors leading to the contacts 51ª and 51ᵈ, respectively, of each group. Thus when the auxiliary motor is in its normal position its brushes stand in the dotted position indicated in Fig. 1, thereby forcing the starting-current to traverse the equal inductive resistances 52 52ª or 53 and 53ª before passing through the two quarter-phase windings of the auxiliary motor 1. When the auxiliary motor moves, however, either to the right or to the left, it first cuts out the inductance, thereby increasing its torque after its inertia has been overcome, and then by bringing its brush on a short contact 51 or 51ᵉ of the two groups again cuts in the inductance, as will be understood from the diagram, thus serving to hold the motor in position until its circuits are opened, as will be presently described. By the arrangement of the inductances shown the auxiliary motor acquires sufficient power to force the blade-switches 45, 46, and 47 of the main motor firmly into the jaws of its contacts to make a reliable electric connection. On the outer end of the shaft 42 (see Figs. 2 and 4) is secured a crank 54, to which is connected a link 55, pivoted to a lever 56, journaled in the framework at 57. A weighted lever 58 is journaled on a stud 59, secured to the framework. To this stud is secured links 60 60ª, pivotally connected with brake-shoes 61 61ª, adapted to frictionally engage a disk or drum 62 on the shaft 63 of the main motor. On the lever 58 is mounted a sliding weight 64, as seen in Fig. 2, by which the strength of the brake may be varied. Sensitiveness may be secured by raising or lowering the end of the lever 58, thereby shifting the brake-shoes closer or farther from the brake-disk.

In order to insure the safety of the elevator and machinery in case of failure of the switches to act, we provide on the shaft of the winding-drum 22 a threaded extension 66, (see Fig. 3,) which is engaged by a nut 67, provided at opposite diametric points with grooves to engage a spline on the guide 68. The length and pitch of the thread are so arranged that the nut 67 will make a complete traverse from one end of the screw to the other while the car rises from the bottom of the shaft to the extreme top, or vice versa. The nut runs freely along the screw, being kept from turning by the guide 68. This guide is mounted upon and securely fastened to a wheel 69, turning freely upon the drum-shaft 22, being given a normal bias or tendency toward a fixed position by a weight 70, connected with the rim of the wheel 69 by a rope passing over sheaves, as indicated. The wheel 69 carries a pinion gearing with one end of a rack-bar 71, the other end of which gears with a sector 72, loosely mounted on the switch-shaft. Secured to this sector are lugs 73 73ª, (see Figs. 2 and 6ª,) which are adapted to engage with a shoulder on crank 77. Each of these weighted levers 74 74ª has offsets 76 76ª, adapted to engage a crank 77, secured to the shaft which passes through the switch-box and which is driven by the auxiliary motor. This crank is connected to the link 55, which operates the brakes. Thus when the auxiliary motor is started in either direction it will serve to rotate the crank 77 and lift one of the weighted arms 74 74ª, thereby insuring a restoration of the auxiliary motor, in case of opening the controlling-circuits, to its initial position and a simultaneous application of the brakes. If the elevator is moving upward, one of the weighted levers will be lifted; if moving downward the other will be lifted. When the crank 77 is shifted by the auxiliary motor for an up or down movement of the car, said crank will be brought to a position where it engages a lug 73 or 73ª of the sector 72, and when the elevator arrives at either limit of its travel the wheel 69 will be positively driven back by the agency already described, forcing the crank 77 by the action of the lug 73 or 73ª on sector 72 to return to the position shown in Fig. 2, against the torque of the auxiliary motor, which is overcome by the greater power of the main motor, thereby putting on the brakes and stopping the machinery.

Figure 4A:
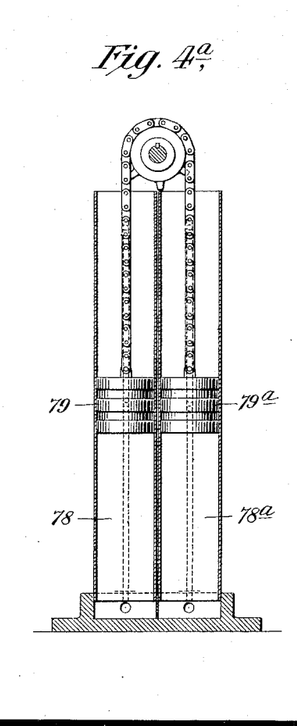

In order to produce a smooth motor action, we provide a double dash-pot, as shown in Fig. 4, comprising two cylinders 78 78ª, open at the top, which are traversed by weights having circumferential grooves, as shown at 79 79ª, connected to a sprocket-chain passing over a sprocket-wheel on the auxiliary-motor shaft. Each of the cylinders has a port 80 near the top, communicating with a closed passage which opens into the cylinder at or near its middle point by a port 81. Another port 82 opens into the cylinder at or near its middle point and below the port 81 and communicates by another passage with the bottom of the cylinder, from which leads a duct 83, in communication with an outwardly-moving valve 84. A set-screw containing a leak-hole coöperates with the duct 83 to limit the rapidity of entrance of air. In the starting position of the auxiliary motor the plungers of the dash-pot occupy a middle position in the cylinders, as indicated in Figs. 4 and 4ª. Thus in starting the air in the lower part of the cylinder will be rarefied, opposing a sudden action of the machinery. So, also, when the motor approaches the limit of either direction of movement one or the other of the plungers will cover the port 80 of its cylinder, thereby preventing the entrance of air below the plunger and acting as a cushion to slow down the movement of the auxiliary motor.

The operation of the system is as follows: Assuming that a prospective passenger is at the third landing and desires to use the elevator, he will operate the circuit-closer 14, and if the car be occupied he will be unable to control it for the reason that the controlling-circuit will be open in the car where the passenger is holding some one of the car-switches, thereby opening the controlling-circuit through the middle lever of the switch; but if the car be unoccupied and we will say below the third landing, as shown in Fig. 1, then current will flow from the main wire $b$, through the successive door-switches 6 5 4 3 and by way of wire 2, to the auxiliary motor, one branch passing, by way of arc 50, to the carbon brushes, thence through the resistance 53 and by segment 51ᵈ to wire 86 by wire 87 and the governor-switch 34, which is now closed because the car is below the landing, thence by wire 88 to one arm of the floor-switch 14 and through wire 19 to the car-cable, thence through the middle contact of the car-switches in series to the flexible cable 89 and out to the main wire $c$. The other branch of the auxiliary motor passes through segment 50ª, inductance 53ª, to wire 86ª, thence through the governor-switch and by wire 88ª to the upper lever of circuit-closer 14 and by wire 90 to the main $a$. Thus both branches of the auxiliary-motor circuit are closed and the latter starts slowly through the action of the dash-pots already described and rotates the switch-box shaft 42 and, after cutting out the inductances 53 53ª, rapidly acquires power and throws the blades 45 46 47 of the main-motor switch between the three pairs of contact-jaws on the right side, as seen in Fig. 6ª, completing the main-motor circuit for an up movement, as will be understood from the diagram of the main-motor connections in Fig. 1. The brakes are removed from the brake-disk simultaneously with the operation of the auxiliary motor in the manner already described, so that the main motor is free to operate the machinery and lift the car. As the car moves up the shaft in passing any floor its governor-switch will be automatically shifted by the inclined guide 30 of Fig. 5 engaging the rollers of the elbow-levers, opening the "up" switch, as has hereinbefore been described, thereby putting the circuits in a position to respond to a call by a prospective passenger from all landings below the car, but disabling the up switches of all landings below the car. A similar action takes place with any other floor-switch except for the first and last landings, for which but a single governor-switch is provided, as of course the car has always to be called from but one direction by a passenger wishing to use it at those points. The mechanism connected with the elevator-door for operating the door-switches 3 4 5 6 has not been shown, as specifically it forms no part of the invention and such devices are already well known in the art. After the passenger has entered the car no movement can be effected until the elevator-door has been closed by reason of the door-controlled switches 3 4 5 6, just referred to. If he wishes to proceed to the top floor, he will press the extreme right-hand switch, thereby opening the middle contact of the switch and disabling all floor-switches and simultaneously closing the circuit from the wires $a$ and $c$ by way of the flexible cable through the car-switch and conductors in the flexible cable to conductors 91 $91^a$, through the governor-switch 11, corresponding to the fourth landing, and by the auxiliary-motor resistance-box and its contacts to the motor 1, and back to the return-wire $b$ by conductor 2. Thus the operating-circuits will be closed and by reason of the circuit connections through the motor-governor shown will always shift the auxiliary motor in a direction to insure an upward movement of the car. If the third circuit-closer in the car had been depressed, the circuit connections would have been by way of governor-switch 10 and through its up switch, which is shown closed in the diagram, thereby supplying current to the auxiliary motor in a proper direction to close the "up" set of main-motor connections by which the car will be lifted. If, however, the car had been above the third floor, the up governor-switch 34, corresponding to the third floor, would be open, whereas $34^a$ would be closed, thereby insuring a reverse movement of the auxiliary motor and reverse connections of the main motor, resulting in a downward movement of the car, and when the car arrives at the floor the governor-switch of the down side would open, thereby opening the auxiliary-motor circuit, putting on the brakes, and arresting the car. If by accident two prospective passengers, one above and the other below the car, should depress the floor-switches at the same time, the inductances 52 $52^a$, &c., would prevent short-circuiting the mains.

Having thus described our invention, what we claim as new, and desire to secure by Letters Patent, is—

1. An electric elevator comprising hoisting machinery, a polyphase electric motor for controlling said machinery for either direction of travel, branch circuits representing each current phase extending along the elevator-shaft, switches accessible to an operator controlling said branches, and a governor operated by the movement of the apparatus for reversing the phases with respect to the motor-terminals.

2. An electric elevator comprising hoisting machinery, a driving-motor for operating the latter, controlling electric circuits extending to the car and the several floors, including switches at these points, and a circuit-breaker actuated directly by the car-switch for breaking the floor-switch circuit and for disabling the latter when a car-switch is in use.

3. An electric elevator comprising hoisting machinery, a polyphase electric motor for driving the latter, an auxiliary polyphase motor for determining its direction of movement, polyphase branch circuits extending to the switches in the car corresponding to the several landings and to floor-switches on the several landings, means for reversing the motor connections with respect to the switches when the car passes a landing, and connections whereby the controlling-circuit from the floor-switches is opened and said switches are disabled when a car-switch is operated.

4. An electric elevator comprising hoisting machinery, a polyphase electric motor for driving the latter, an auxiliary polyphase motor to determine its direction of movement, switches in the car and at the several landings, a plurality of polyphase branches extending to the several switches, and a circuit-breaker controlled by the several car-switches for opening one branch of all floor-switch circuits when any car-switch is actuated.

5. In an electric elevator the combination of hoisting machinery, an electric controller for determining the direction of the car, a series of switches at the several landings, and a governor driven by the hoisting apparatus containing an independent current-reversing device for each floor actuated by the governor in accordance with the movements of the car, whereby when the car passes a floor, the controller connections will be reversed by the governor, insuring a return of the car to any floor when the corresponding car or floor-switch is operated.

6. An electrically-controlled elevator comprising hoisting machinery and a propelling-motor, an electrically-controlled device for determining the direction of movement of the latter, floor-switches, and a governor comprising a series of current-reversers mounted in a circle and adapted to be spaced at different circumferential positions, and means driven by the hoisting machinery for actuating said current-reversers as the car passes the several landings.

7. An electric elevator comprising hoisting machinery, a motor for driving the same, an electrically-operated controller for said motor, and a governor comprising a series of current-reversers by which the direction of movement of the controller is determined, said governor having a double-grooved ring provided with guides as 30 connecting the grooves, each current-reverser having a controlling-lever coöperating with said grooves.

8. An electric elevator comprising hoisting machinery, and controlling-switches for an up-and-down movement accessible to an operator, in combination with a governor driven by the hoisting machinery containing a rotary device for successively operating the circuit-breakers on the upward or downward movement of the car.

9. An electric elevator comprising hoisting machinery, a propelling-motor, an auxiliary electric motor for determining the direction of movement of the latter, a brake operated by the auxiliary motor, and a weighted arm raised by the auxiliary motor when operated, to restore the latter to its normal position when the controlling-circuit is ruptured.

10. An electric elevator comprising hoisting machinery, a propelling-motor, an auxiliary motor to determine the direction of movement of the latter, weighted, pivoted arms raised by said motor when shifted for an up or down movement of the car respectively, and a brake operated by said arms.

11. An electric elevator comprising hoisting machinery, a propelling-motor, an auxiliary controlling-motor to determine its direction of movement, and a safety device operated by the hoisting machinery for forcing back the controlling electric motor against its torque to its normal position and simultaneously putting on the brakes when the car reaches its limit of travel.

12. An electric elevator comprising hoisting machinery, a propelling-motor, a controlling electric motor for determining its direction of travel, and a safety device comprising a screw as 66, a nut as 67, means connected therewith for forcing the controlling-motor to its normal position, and a weighted controlling device connected with the nut for insuring a return of the latter to a central position on the screw, upon a reversal of direction of the movement of the car.

13. An electric elevator comprising a main electric motor for hoisting the car, an auxiliary motor and switches controlled thereby for making or controlling both motor-circuits, comprising arms 44, 45, and 46 and coöperating contacts for closing the main-motor circuit and graduating the torque of the auxiliary motor.

14. An electric elevator comprising a main motor for hoisting the car, an auxiliary motor, switches controlled by the latter for making or reversing the main-motor circuits and graduating its own torque, and mechanical devices for restoring the auxiliary motor to its normal position when its circuit is ruptured.

15. An electric elevator comprising two alternating-current motors, one for propelling the hoisting machinery, and the other to control the circuits of the first, car-controlling switches for closing or reversing the auxiliary-motor circuits, and devices operated by the auxiliary motor for cutting inductances out of its circuit to increase its torque after starting.

16. An electric elevator comprising a main propelling-motor, an auxiliary motor for making or reversing the motor-circuits, and a dash-pot operated by the auxiliary-motor shaft for slowing the movement of said device near the ends of its traverse in either direction.

In testimony whereof we have hereunto subscribed our names this 28th day of March, 1898.

ALONZO B. SEE.
NILS O. LINDSTROM.
DANIEL A. MASON.

Witnesses:
C. H. MERRITT,
S. A. THOMAS.